US010369597B2

(12) United States Patent
Farlotti

(10) Patent No.: US 10,369,597 B2
(45) Date of Patent: Aug. 6, 2019

(54) ASSISTED MANUAL MAIL SORTING SYSTEM

(71) Applicant: Neopost Technologies, Bagneux (FR)

(72) Inventor: Laurent Farlotti, Arcueil (FR)

(73) Assignee: Neopost Technologies, Bagneux (FR)

(*) Notice: Subject to any disclaimer, the term of this patent is extended or adjusted under 35 U.S.C. 154(b) by 0 days.

(21) Appl. No.: 15/657,366

(22) Filed: Jul. 24, 2017

(65) Prior Publication Data
US 2018/0029083 A1 Feb. 1, 2018

(30) Foreign Application Priority Data
Jul. 29, 2016 (EP) .................................. 16305988

(51) Int. Cl.
*G06K 9/00* (2006.01)
*B07C 3/10* (2006.01)
(Continued)

(52) U.S. Cl.
CPC ............. *B07C 3/10* (2013.01); *B07C 3/003* (2013.01); *B07C 3/008* (2013.01); *B07C 3/02* (2013.01);
(Continued)

(58) Field of Classification Search
CPC ........... B07C 3/003; B07C 3/008; B07C 3/02; B07C 3/10; B07C 7/005;
(Continued)

(56) References Cited

U.S. PATENT DOCUMENTS

| 5,794,789 A | 8/1998 | Payson et al. |
| 6,786,404 B1* | 9/2004 | Bonner .................... B07C 3/00 235/383 |

(Continued)

FOREIGN PATENT DOCUMENTS

| EP | 0 586 883 A2 | 3/1994 |
| EP | 0 928 641 A1 | 7/1999 |

(Continued)

OTHER PUBLICATIONS

Knapp AG, "KiSoft Vision," Product Photographs, uploaded Dec. 7, 2011, 4 pages, (from You tube). (Year: 2011).*

(Continued)

*Primary Examiner* — Amara Abdi
(74) *Attorney, Agent, or Firm* — Cozen O'Connor

(57) ABSTRACT

Assisted manual mail sorting system for assisting an operator in manual sortation of mailpieces in a sorting station including a plurality of destination bins, the system comprising a headset wearable by the operator and connected to a computer comprising an image analysis software for extracting from an image of one of the mailpieces, a name, an address or other relevant information and a sorting application for determining a corresponding relevant destination bin, the headset comprising: a high resolution camera for capturing the image of the mailpiece, a transparent display for signalling to the operator the relevant destination bin where the article is to be placed by highlighting or overlaying a visual artifact on a view of the sorting station while the operator is looking at the sorting station.

20 Claims, 6 Drawing Sheets

(51) Int. Cl.
- *B07C 3/00* (2006.01)
- *B07C 3/02* (2006.01)
- *G06K 9/20* (2006.01)
- *B07C 7/00* (2006.01)
- *G06K 9/78* (2006.01)

(52) U.S. Cl.
CPC .......... *B07C 7/005* (2013.01); *G06K 9/00442* (2013.01); *G06K 9/00671* (2013.01); *G06K 9/20* (2013.01); *G06K 9/78* (2013.01); *B07C 2301/0008* (2013.01); *B07C 2301/0066* (2013.01)

(58) Field of Classification Search
CPC .... B07C 2301/0008; B07C 2301/0066; G06K 9/00442; G06K 9/00671; G06K 9/20; G06K 9/78
See application file for complete search history.

(56) References Cited

U.S. PATENT DOCUMENTS

| | | | |
|---|---|---|---|
| 2015/0110343 A1* | 4/2015 | Worth, II | B07C 7/005 382/101 |
| 2016/0132707 A1* | 5/2016 | Lindbo | G06K 7/10544 235/462.42 |
| 2017/0038835 A1* | 2/2017 | Algotsson | G06F 3/005 |
| 2017/0193124 A1* | 7/2017 | Wong, Jr. | G06K 7/10297 |
| 2017/0200296 A1* | 7/2017 | Jones | G06T 11/60 |
| 2017/0289535 A1* | 10/2017 | Crispin | H04N 17/004 |

FOREIGN PATENT DOCUMENTS

| | | |
|---|---|---|
| EP | 1 185 383 A0 | 10/2000 |
| WO | 00/59649 A1 | 10/2000 |

OTHER PUBLICATIONS

European Search Report, dated Jan. 11, 2017, for European Application No. 16 30 5988, 2 pages.

Knapp AG, "KiSoft Vision," Product Photographs, uploaded Dec. 7, 2011, 4 pages.

YouTube, "Barcode Scanning with Google Glass—Scandit "Pick by Vision" Demo," published May 2, 2014, 1 page.

\* cited by examiner

ASSISTED MANUAL MAIL SORTING SYSTEM

TECHNICAL FIELD

Background

The present application refers to an augmented reality (AR) system that can be used to assist an operator in manual mail sortation.

Although the sortation of mail has been largely automated by the Posts in the past decades, there is still a fair proportion that cannot be processed in sorting machines. This is the case notably for thick letters, flats or small parcels, but also letters containing fragile (or adversely very stiff) items, envelopes made of certain materials, etc. The reasons can be purely mechanical or optical, for instance the address cannot be captured properly due to reflection of light or wrong positioning. Some postal products require specific treatments and cannot be mixed with ordinary man.

Therefore, the most advanced Posts are still using manual sortation beside their sorting machines. Other Posts do not have automated sorting equipment for technical or economic reasons. Optical character recognition (OCR) may not be adapted in certain countries, or the logistics of mail does not justify the investment. Manual sortation of inbound or outbound mail is also the rule in the vast majority of businesses, tough some large corporations have invested in automated equipment.

A manual sorting station generally includes a group of destination bins where each mailpiece is deposited, and, in some cases, a system to assist the operator in determining the destination bin. One example of such a system is the Neopost Smart Sort, which allows operators to sort postal mail by voice. Wearing a wireless headset, the operator reads aloud the name of the addressee. The system searches its database and displays and/or speaks the correct sorting information.

Voice recognition may not be the most convenient solution because a mailroom environment can be noisy, or the system must be trained to the way of pronouncing words each time an operator changes. Other systems rely on barcode recognition (BCR) or optical character recognition (OCR) to determine the addressee name and/or destination bin. A few examples are given thereafter as they are more closely related to the present invention.

Related Art

EP0586883 describes a data processing method and system to provide active pigeon hole sorting for mail pieces in a postal system. A pile of mail sits before a reading device so that as each piece of mail is sequentially pulled from the pile, it is passed by the reading device where a deferred optical character recognition (DOCR) bar code number is read, or alternately, where a local sorting bar code number is read. The pigeon holes in the sorting case are actively indicated with a prompting light to facilitate the operator physically sorting the mail piece down to delivery sequence.

U.S. Pat. No. 5,794,789 discloses inter-related devices and methods to increase sort productivity. The semi-automated integrated sort system has an array of chutes that flow shipments into containers or bins. The entrance to each chute is blocked by a computer-controlled gate. An information input interface is operably connected to the computer for entering destination information. The input interface can be an optical reader such that the computer performs OCR on packages; a microphone such that a person announces destination information, or a manual input device. The computer transmits a signal to the system controller to light the appropriate chute indicators and to activate the appropriate chute gate enablers. The operator then places the shipment in the chute designated by the lit chute indicators, which is also the only chute with a gate that is unlocked.

EP0928641 describes an apparatus for providing assistance in manual sorting of articles of mail in storage elements or pigeon-holes corresponding to determined destinations. The apparatus has optoelectronic recognition means for identifying on an article of mail, one item of data suitable for providing information about the destination of said article, comparator means for comparing said data item with a plurality of previously stored data items, allocation means for allocating a unique identity code to said recognized data item corresponding to a determined storage element allocated to a particular destination, and contactless transmission means for transmitting said identity code to all of the storage elements, each of said storage elements being provided with indication means mounted on removable fixing means and responding selectively to said identity code.

The reading of articles is carried out by a terminal comprising entry means, reading and recognition means, and exit means of the recognized documents. The entry means comprises a feeder to allow the treatment of a pile of articles. The reading means classically comprise digitalization hardware and character recognition software. This recognition can also be carried out following vocal reading of relevant data recorded on the article. An identifying code corresponding to a destination rack of the article is emitted. This identifying code is emitted to all racks at the same time, but only the indication mean of the destination rack is responding following a comparison between this code and its own internal code, the indication means of the other racks remaining inactive.

Unlike the first two systems, the apparatus of EP0928641 does not require specific furniture or modification of existing ones, because the indication means are mounted in a removable manner, have their own power supply and are activated wirelessly. The apparatus can thus be installed relatively easily in a conventional mailroom. However the handling of articles of mail in and out of the reading terminal can be cumbersome. Moreover such terminal is not adapted to the reading of thick letters, flats or small parcels. As the indication means are not irremovably fixed on the racks, these can fall down during deposition of articles, be broken or inverted when mounted back.

Considering that manual sortation of mail will stay in many Posts and companies, there is a need for a system that assist operators, require little training and modification to existing mailrooms or sorting centres, and does not have some of the drawbacks of the prior art.

Advantages

A system that can help operators to sort all kind of letters, flats or small parcels in destinations bins, and can easily be implemented in various environments like mailrooms or sorting centres. The system may use a combination of image and voice indications to determine the destination and to indicate where the mailpiece is to be placed.

The system may not require additional handling operations and keeps the sorting process as close as possible to the existing one.

The system may "learn" from an experienced operator without requiring extensive set-up, and is easily reconfigurable.

SUMMARY

These advantages are achieved by a system which takes advantage of augmented reality (AR). Augmented reality is a live direct or indirect view of a physical, real-world environment whose elements are supplemented by computer-generated sensory input such as sound, images or data. With the help of advanced AR technology (e.g. adding computer vision and object recognition) information about the surrounding real world of the user becomes interactive and digitally modifiable. Information about the environment and its objects is overlaid on the real world.

More particularly, embodiments of the invention relate to an assisted manual mail sorting system for assisting an operator in manual sortation of mailpieces in a sorting station including a plurality of destination bins, the system comprising a headset wearable by the operator and connected to a computer comprising an image analysis software for extracting from an image of one of the mailpieces, a name, an address or other relevant parameter and a sorting application for determining a corresponding relevant destination bin, characterized in that the headset comprises: a high resolution camera for capturing the image of the mailpiece, and a transparent display for signalling to the operator the relevant destination bin where the article is to be placed by highlighting or overlaying a visual artifact on a view of the sorting station while the operator is looking at the sorting station.

With this configuration, the described system features a headset with a high resolution camera connected to a computer. The computer can be integrated in the headset or located remote to the headset. An image of the mailpiece is captured by the high-resolution camera. The name, address or other relevant information is extracted from that image and the destination bin is determined, then signalled to the operator through a transparent display of the headset. These operations can be performed on the fly as the operator manipulates the mailpieces and there is practically no difference with a manual process.

The system requires little modifications to existing equipment. Generally the bins already bear a destination name in clear, or an ID (barcode or number) that can be also recognized by the system. In a set-up phase, the location of the bins are "learned" and associated with ZIP codes, addressee, department or company names, or mail category, or any other parameter used to trigger sortation. The spatial layout of the bins is registered so that a first indication of the destination can be displayed without reading the names or ID tags, and confirmed by reading before or just after the mailpiece has been deposited.

The system can learn from an experienced operator. The association between ZIP codes, addressee and department or company names is determined as the system learns. Then a non-experienced operator can take over without need to be trained. This is particularly useful for sorting incoming mail in large corporations where operators can change frequently.

Advantageously, the headset further comprises 3D sensors for acquiring a spatial position of the destination bins and the transparent display comprises a target to be positioned on a graphic element of the mailpiece or on the names or tag identifiers of the destination bins before capturing an image on the mailpiece or reading the name or tag with the high resolution camera.

Preferably, the target is a visual artifact displayed when the graphic element is not located within a predetermined duration.

The invention also relates to an assisted manual mail sorting method for assisting an operator in manual sortation of mailpieces in a sorting station including a plurality of destination bins, the method comprising:
 capturing with a high-resolution camera an image of the mailpiece,
 extracting from the captured image, with an image analysis software of a computer, a name, an address or other relevant parameter to determine with a sorting application a corresponding relevant destination bin, and
 signalling to the operator with a transparent display the relevant destination bin where the article is to be placed by highlighting or overlaying a visual artifact on a view of the sorting station while the operator is looking at the sorting station, wherein the high-resolution camera and the transparent display are included in a headset wearable by the operator and connected to the computer.

Preferably, the method further comprises notifying an indication or confirmation to the operator that the article has been placed in the relevant destination bin.

BRIEF DESCRIPTION OF THE DRAWINGS

The embodiments of the invention will be described and explained with additional specificity and detail through the use of the accompanying drawings in which.

DETAILED DESCRIPTION OF EXEMPLARY EMBODIMENTS

Figure 1:
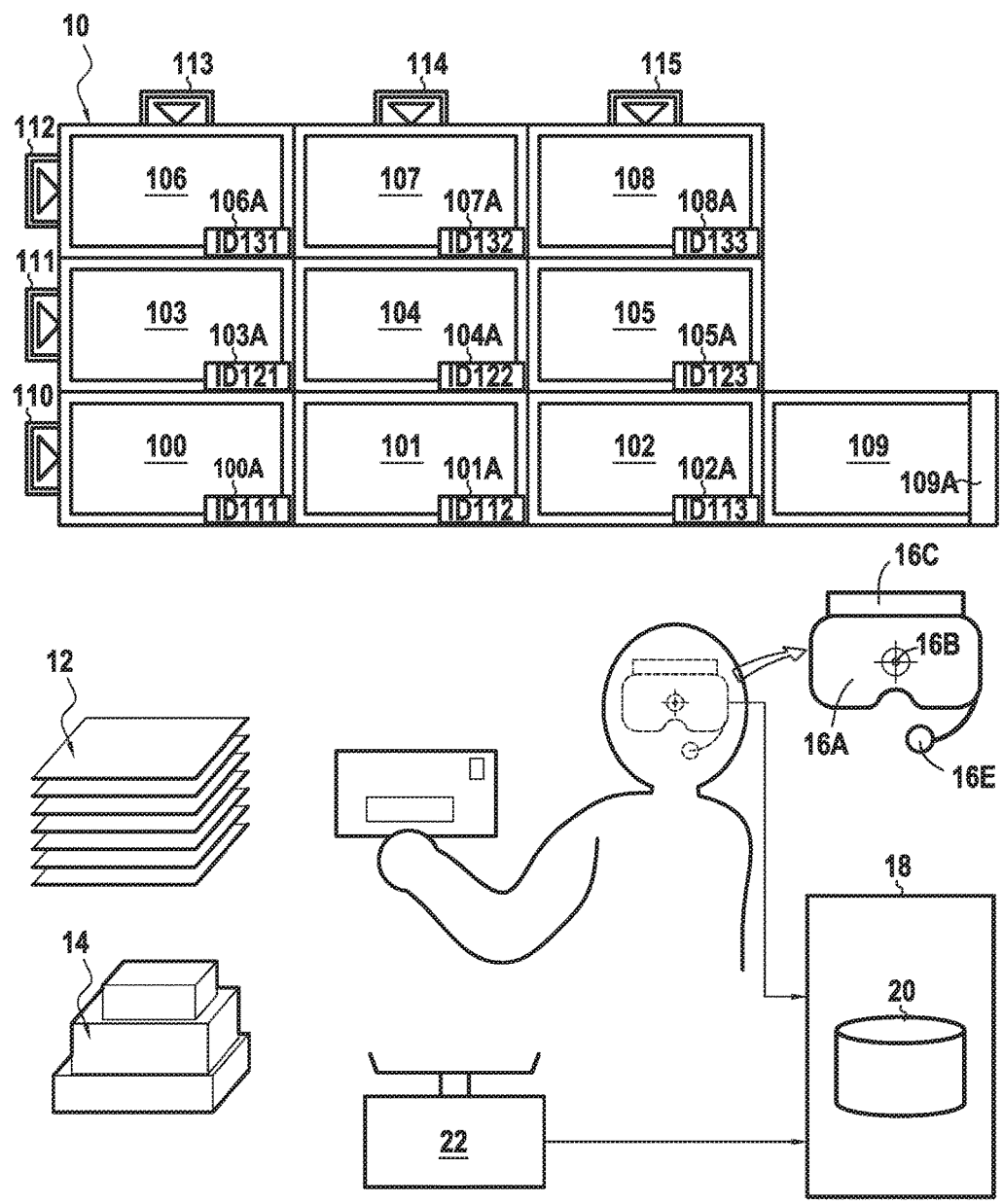
FIG. 1 is a schematic view of a sorting station incorporating the system according to an embodiment of the invention.

FIG. 1 is a schematic view of a sorting station incorporating the system of the invention. In this example, the sorting station 10 is located in an enterprise's mailroom, but one or many similar sorting stations may be located in a postal sorting centre. The sorting station includes several destination bins, in a vertical and/or horizontal arrangement. For convenience, only nine bins 100-108 have been represented in a three column combination, but the system can be used with any other practical arrangement of bins. The bins may also be disposed in separate groups, corresponding for instance to distinct subsidiaries, countries or ZIP codes areas. Basically the system can be adapted to any existing physical arrangement of destination bins, either for inbound or outbound mail. In this example, each of the bins bears a tag identifier 100A-108A. This tag may be printed with a destination (addressee, department or company) name in clear, or a ZIP code, or number or barcode ID.

The mailpieces to be sorted may include letters, flats or small parcels, which are usually disposed in one or several piles 12, 14. The operator picks mailpieces one by one and places them in the bins corresponding to their destinations. The operator may &so hold a group of mailpieces with one hand and extract them in sequence from that group with the other hand. The destination is determined according to the addressee, department or company name, the ZIP code, the category of mail or any other parameter used to trigger sortation. If the destination cannot be determined, the operator may place the mailpiece in an error/reject bin which can be either a separate bin 109, or a particular one of an existing group of bins.

The operator wears a headset 16 including a transparent display or screen 16A and a high resolution camera 16B and an embedded controller 16C connected to a computer 18. An image of the mailpiece is captured by the high-resolution camera. The address is extracted from that image and the destination bin is determined, then signalled to the operator on the screen of the headset while the operator is looking at the sorting station 10. These operations can be performed on the fly as the operator manipulates the mailpieces and are possible because the spatial layout of the bins 100-109 is also recorded so that a first indication can be displayed by the headset 16 (e.g. overlaid on the real physical bin) as soon as the destination is determined. There is practically no difference with a manual process. The computer includes an address database where the association between the position of the bins and the ZIP codes, addressee, department or company names, or other parameters used to trigger sortation is recorded. If the destination bin is not immediately visible for the operator (e.g. not in the view field covered by the transparent display 16A) the direction of the bin may be indicated by an arrow on the left, or on the right, of the view field.

As the operator is approaching with the letter, the name or tag identifier of the corresponding bin is read with the high-resolution camera 16B and confirmed before or just after the mailpiece has been deposited. This confirmation may be notified to the operator on the screen 16A by highlighting the tag identifier of the bin, or displaying a green flag, or emitting a specific noise, or in any convenient manner. It is also possible that a signal, red flag or the like, is emitted only in case of an error, when the mailpiece is mistakenly placed in a wrong bin.

Several variants can be considered. For instance, the system may not have spatial positioning features, or no knowledge of the spatial layout of the bins. In this case, the indication and/or confirmation of the destination bin of a given mailpiece is based on the reading of the tag identifiers. The operator has to sweep across the various bins until a match is found between the destination determined from the address captured on the mailpiece, and the tag identifier of the corresponding bin. This variant is only practicable when the number of bin is relatively low, but such configuration may exist if for instance one destination bin corresponds to a subsidiary or region, regrouping a large number of addressees or ZIP codes.

Adversely, the tag identifiers of the bins may be ignored, or there might even be no tag identifier, if the indication of the destination bin is based purely on spatial positioning and knowledge of the spatial layout of the bins. In this case, a set-up phase is mandatory for the system to "learn" the location of the bins. Some markers such as large tags 109A or easily identifiable objects 110-115 or colours may also be added to the sorting station in order for the system to locate a specific group of bins.

Learning of the spatial layout of the bins is anyway necessary in the general case, although the learning can happen in a set-up phase, or on the fly while an experienced operator performs the sortation of mailpieces based on his personal knowledge of the spatial layout.

Other inputs than the address extracted from the image of the mailpiece can be used to determine the corresponding destination bin. For instance, the operator may read the address, like in the Neopost Smart Sort solution, through a microphone 16E of the headset. This is useful when address determination by OCR fails for whichever reason. This may also be required if one parameter used to trigger sortation or to supplement sorting information cannot be captured by vision, like for instance the weight of a mailpiece. In this case, a scale 22 can be connected to the computer 18 for the weight to be captured automatically. The system may also use parameters extracted from the image of the mailpiece outside the address. For instance, the name, the origin or category of mail (registered, urgent, personal, confidential, commercial), a specific postal service mark or other information that can be extracted from the franking mark and/or the regulated customer area.

Figure 2A:
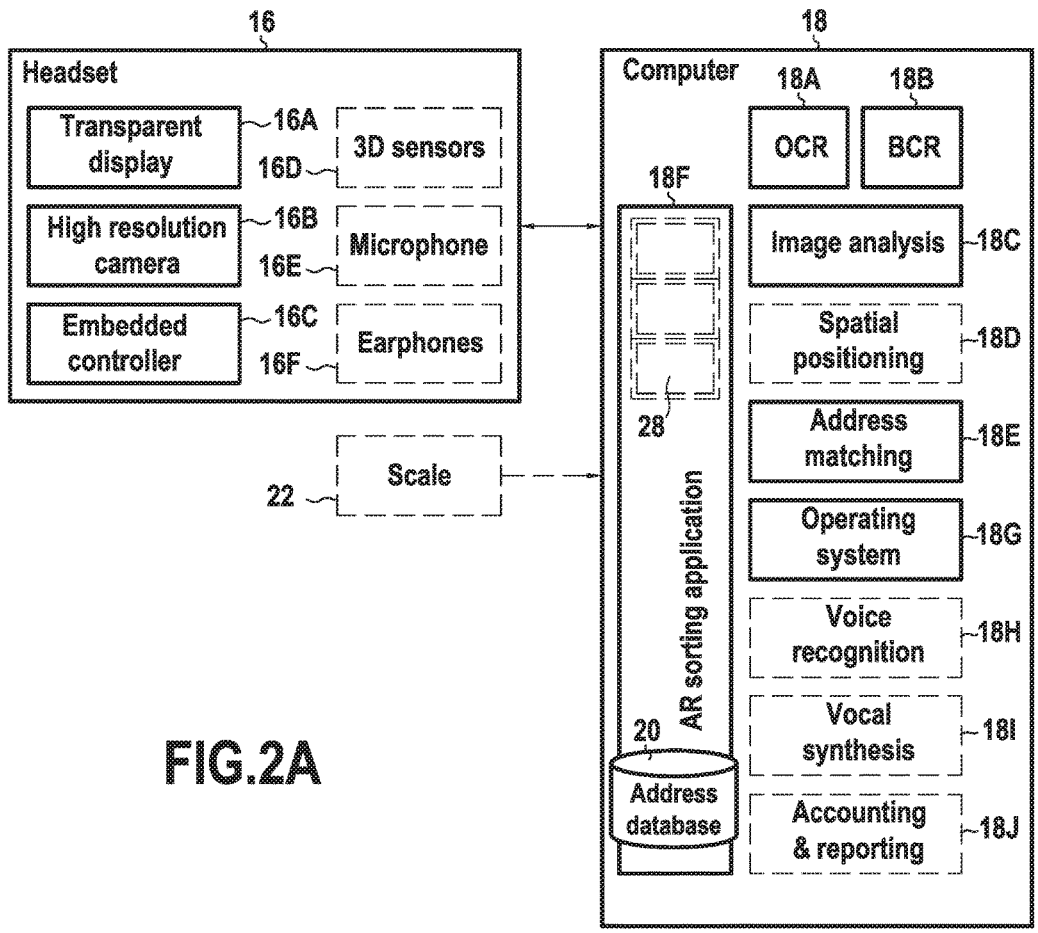
FIGS. 2A and 2B show more detailed views of the system according to an embodiment of the invention.
Figure 2B:
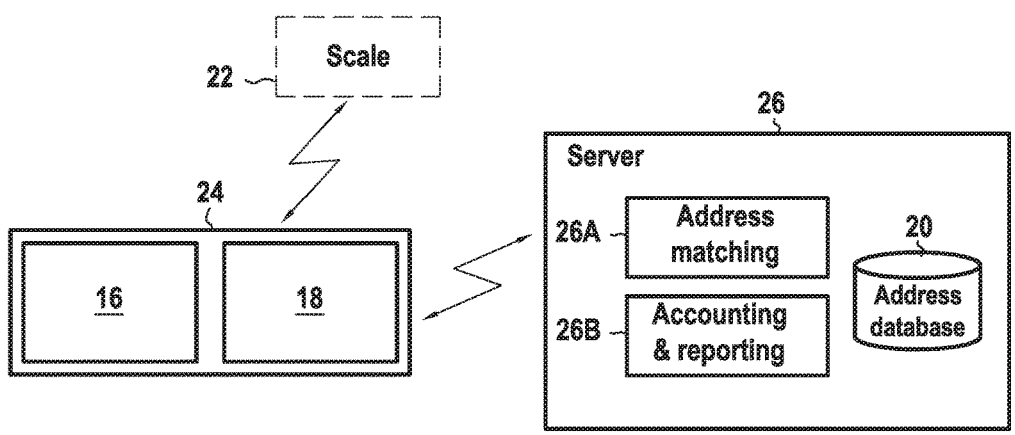

FIG. 2A shows a more detailed view of the system of the invention. The main elements of the system are the headset 16 and the computer 18. The headset is specifically intended for augmented reality, while the computer may be a generic computer where the various software components necessary to provide augmented reality have been loaded. Other software components may also be loaded on the computer, like for instance accounting or reporting applications usually found in a mailroom environment. The headset is connected to the computer, preferably in a wireless manner, in order to give more freedom of movement to the operator when roaming through the sorting station 10. In a specific embodiment illustrated on FIG. 2B, the headset 16 and the computer 18 may be integrated in a single wearable unit 24, and wirelessly connected to a remote server 26. When present the scale 22 can be wirelessly connected too.

The headset 16 includes the transparent display or screen 16A for overlaying information on the real word, preferably with a horizontal span of 90° or more, the high resolution camera 16B, preferably of 2 megapixel or more, the embedded controller 16C and 3D sensors (for instance infrared sensors 16D) for acquiring the spatial environment of the operator. Visual artifacts (i.e. immaterial objects or images that only exists in a digital environment) are projected on the transparent display, at a position corresponding to real objects resting in the operator's view field, the position of the real objects being acquired by the camera 16B and the 3D sensors 16D. The headset may also comprise the microphone 16E for vocal input and a pair of earphones 16F for vocal assistance in case some information cannot be conveniently displayed.

The computer 18 includes an OCR software (for optical character recognition) 18A, a BCR software 18B (for barcode recognition), an image analysis software 18C, a spatial positioning software 18D, an address matching software 18E, the address database 20, the AR sorting application software 18F and an operating system 18G, which may be specific to augmented reality applications. Other components, like for instance a voice recognition software 18H, a vocal synthesis software 18I, accounting and reporting software 18J, may be loaded on this computer 18. The computer 18 may also be connected to the scale 22 for inputting the weight of a mailpiece, and to a remote server to which sorting data can be sent.

When the headset 16 and the computer 18 are integrated in the single wearable unit 24 and wirelessly connected to the remote server 26, the latter may also host the address database 20 and/or any required software component as such the address matching software 26A and the accounting and reporting software 26B.

The image analysis software 18C includes a set of libraries for image treatment of a mailpiece, like for instance for localization and extraction of the address block, barcode, keywords, pictograms or any image element which is required by the sorting application. The term address database is used in a broad sense to describe a database containing a set of valid addressee, department or company names, postal addresses, ZIP codes, or other parameters which can be matched with the destination bins. The logical association between all possible values of the parameters used to trigger sortation and the destination bin is defined in the sorting application, but can also be recorded in the address database. An address database may not be required if the sortation is based on the origin or category of mail (registered, urgent, personal, confidential, commercial), a specific postal service mark or an information that can be extracted from the franking mark and/or the regulated customer area.

Additional software libraries may also be required for reading the tag identifiers of the destinations bins and for localizing the markers of the sorting station, or for acquiring the spatial environment of the operator and notably the position of the bins or groups of bins by locating the bin within the 3D image of the sorting station.

Figure 3A:
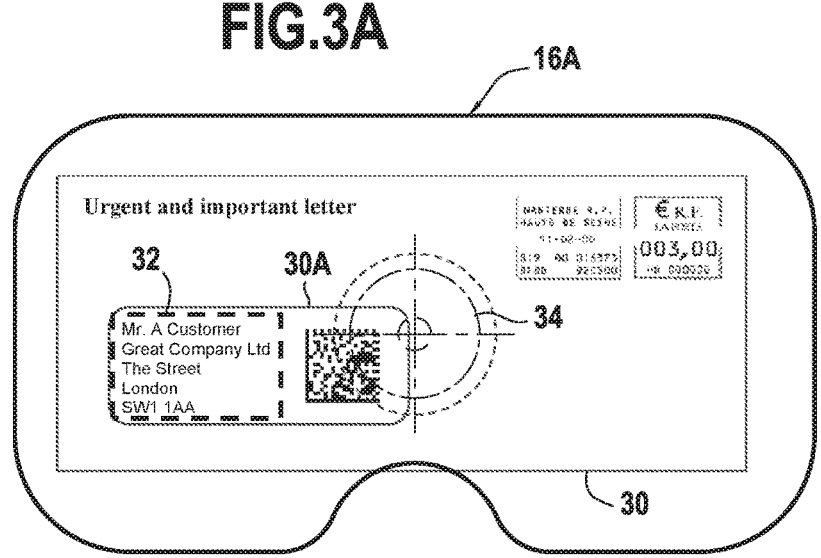
FIG. 3A shows an example of a mailpiece as seen with the system according to an embodiment of the invention.

FIG. 3A shows an example of a mailpiece 30 as seen through the transparent display 16A of the headset. The aspect of this mailpiece is relatively simple, with easily identifiable elements. The recipient address is visible through the envelope window 30A. The franking mark is in the top right corner, in this case a French mark without barcode. The terms "Urgent and important letter" are printed in the top left corner. A 2D barcode used for integrity/tracking purposes is also visible through the envelope window 30A.

In this example, the sortation is based on the destination address. The operator places the mailpiece in front of him and waits for the image to be captured by the high-resolution camera 16B. The image capture is activated after the image is stabilized for a short time of around one second. Alternatively, the image capture may be activated by a command voiced by the operator through the microphone 16E.

The image analysis software 18C identifies the address block by testing the composition and disposition of the various elements. Once the address block has been located, its position can be confirmed to the operator by highlighting or overlaying a visual artifact, for instance a dotted rectangle 32. If the address block is not located within a predetermined duration, for example one or two seconds after the image capture, the operator may move it closer to the centre of view field, represented by a target 34. This target can be displayed on the transparent display of the headset whenever the help of the operator is required to identify or locate a graphic element or item in his view filed.

The terms "Urgent and important letter" may also be recognized by the image analysis software 18C. This mention may be used to direct the mailpiece in a specific bin so that it will be dispatched faster than the rest of the mail or just recorded along with other sorting data (this is mostly applicable to inbound mail).

Figure 3B:
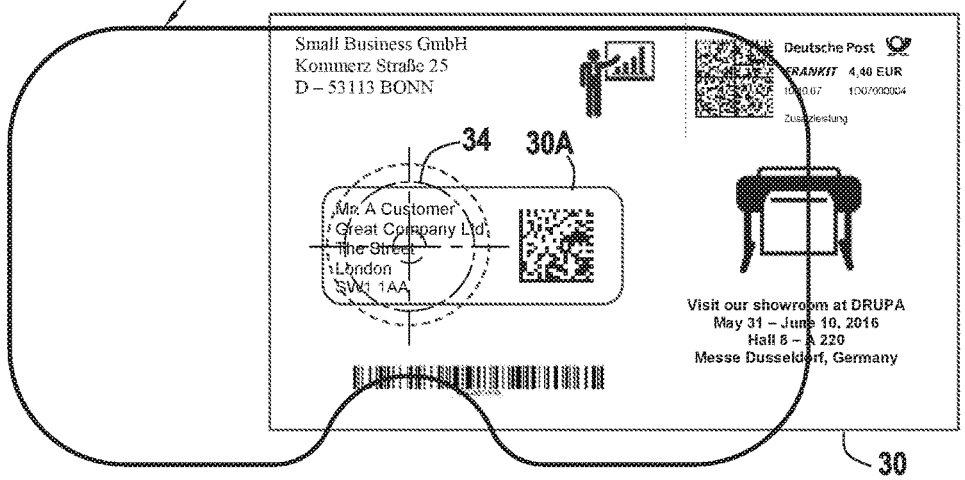
FIG. 3B shows another example of mailpiece as seen with the system according to an embodiment of the invention.

FIG. 3B shows another example of mailpiece 30 as seen through the transparent display 16A of the headset. The aspect of this mailpiece is much more complex. The recipient address is visible through the envelope window 30A, along with the 2D barcode used for integrity/tracking purposes. The franking mark is in the top right corner, in this case a German mark with a 2D barcode. The sender address is in the top left corner. A company logo is printed in the regulated customer area of the franking mark. An invitation to visit a trade show is also printed on the mailpiece, which can be easily mixed with an address. A linear barcode corresponding to a fictive postal service is also printed in the bottom left corner.

In such a complex picture the image analysis system may have difficulties to identify the right address block, if the sortation is based on the destination address. The operator may move the target 34 corresponding to the centre of view field, onto the desired address block. The same method can be used if the parameter used to trigger sortation is included in a barcode, rather than in one address block.

Figure 4:
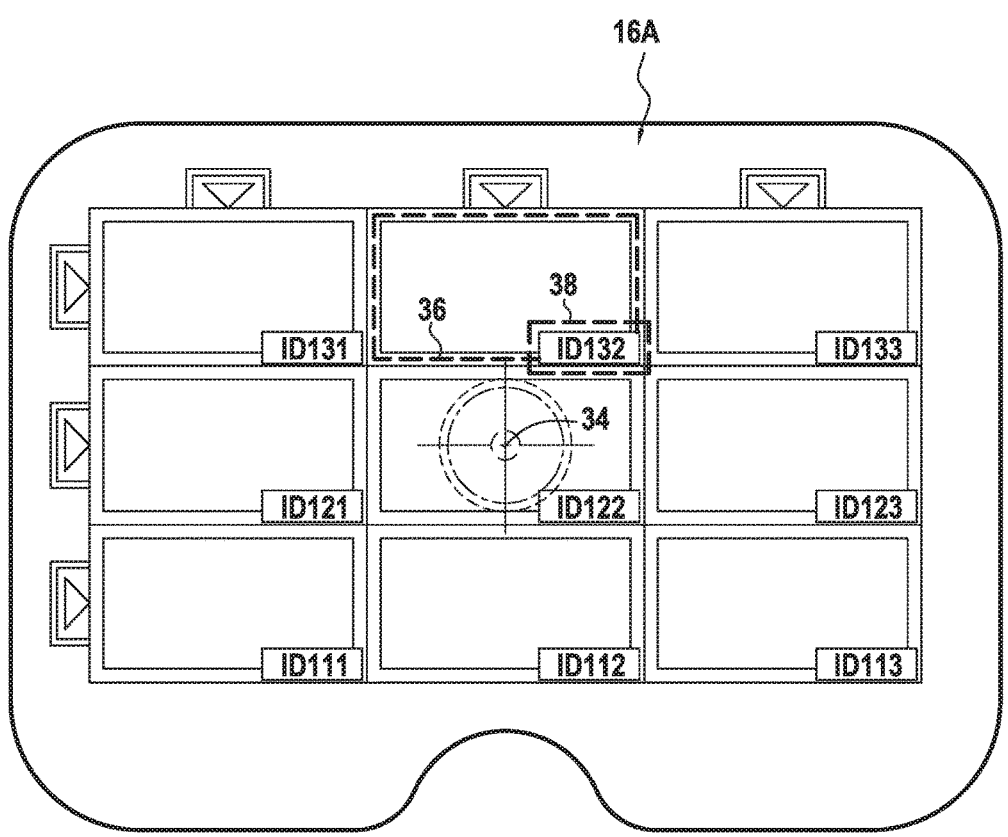
FIG. 4 shows a group of destination bins as seen with the system according to an embodiment of the invention.

FIG. 4 shows a group of destination bins 100-108 as seen through the transparent display 16A of the headset. After the parameters used to trigger sortation has been extracted from the image of the mailpiece, eventually complemented with vocal information, the destination bin corresponding to the mailpiece is identified by look-up in the address database and matching of the bin with the sorting application software. The corresponding bin is signalled to the operator by highlighting it or overlaying a visual artifact, for instance a dotted rectangle 36.

In a second step, as the operator is approaching with the letter, the name or tag identifier of the corresponding bin is read with the high-resolution camera 16B and confirmed before or just after the mailpiece has been deposited. This confirmation may be notified to the operator on the transparent display 16A by highlighting the tag identifier of the bin, or overlaying a visual artifact, for instance a smaller dotted rectangle 38, or displaying a green flag, or emitting a specific noise in the earphones 16F, or in any convenient manner. It is also possible that a signal, red flag or the like, is emitted only in case of an error, when the mailpiece is mistakenly placed in a wrong bin.

If the system has no spatial positioning features, or no knowledge of the spatial layout of the bins, the indication and/or confirmation of the destination bin is based on the reading of the tag identifiers 100A-108A. The operator sweeps the target 34 corresponding to the centre of his view field onto the various tags until the tag identifier of the destination bin is located. Then, the tag itself is highlighted or overlaid with the smaller dotted rectangle 38.

Figure 5:
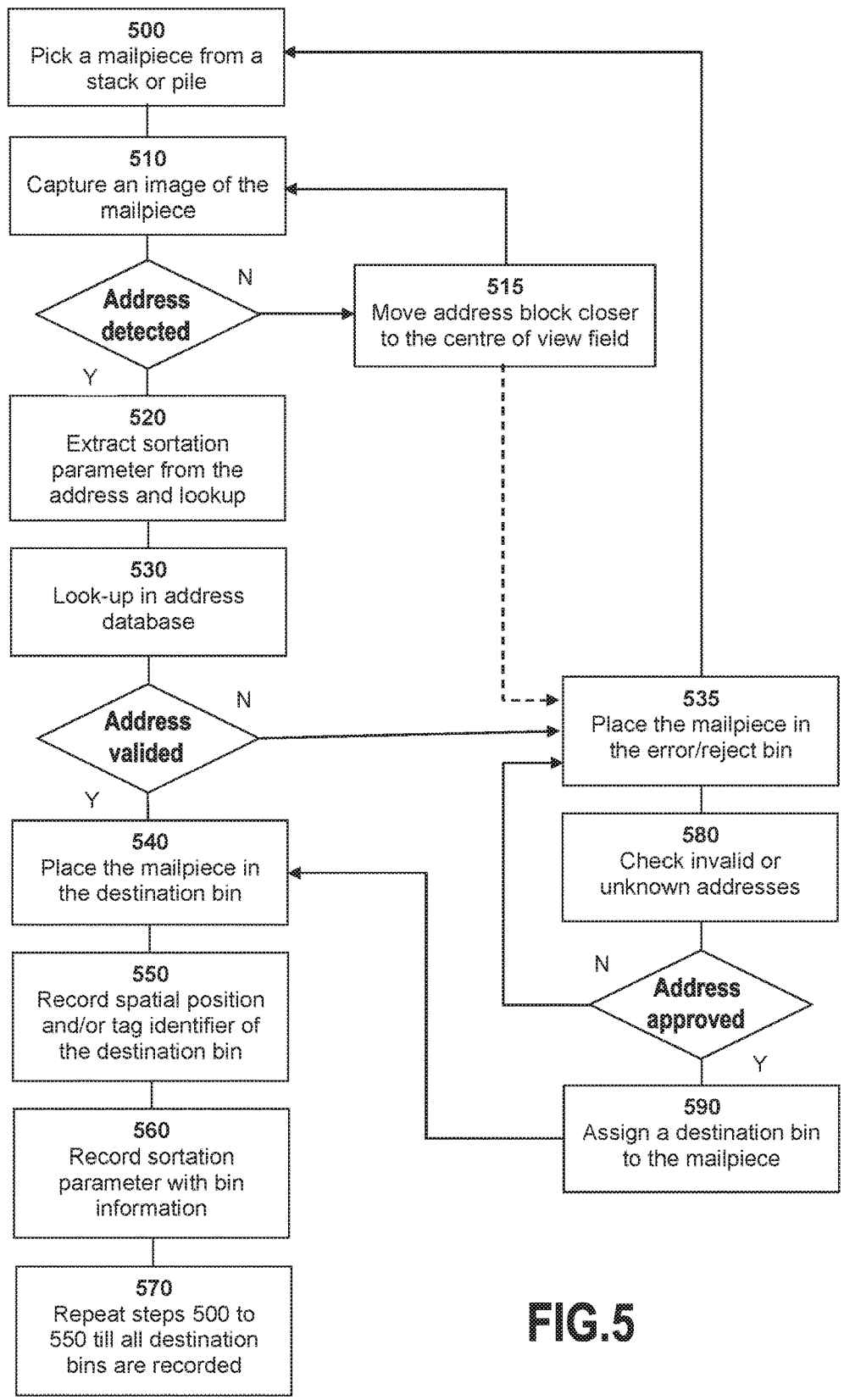
FIG. 5 is a flowchart showing the main acts for setting-up the system according to an embodiment of the invention.

FIG. 5 is a flowchart showing the main acts for setting-up the system of the invention. A set-up phase is necessary for the system to "learn" the location of the bins. This set-up phase involves an experienced operator performing the sortation of mailpieces based on his personal knowledge of the spatial layout of the destination bins. This learning may also happen on the fly during standard sorting operations, so the following acts may take place over a period of time. It is important that all applicable destination bins are recorded for the learning to be complete, including special bins such as the error/reject bin 109 or a bin for urgent and/or important mail (not illustrated) for example. It is also recommended that a logical association between virtual bins (reference 28 on FIG. 2A) and corresponding groups of possible addresses and/or parameter values used to trigger sortation is predefined in the sorting application or recorded in the address database.

At act 500, the operator picks a mailpiece from a stack or pile of mail. He may also hold a group of mailpieces with one hand and extract them in sequence from that group with the other hand. At act 510, an image of the mailpiece is captured by the high-resolution camera 16B of the headset. The image analysis software 18C looks for the address. The term address is used here for convenience, but the sortation may also be based on names, barcodes, indications of origin, mail categories, postal service marks or other information that can be extracted from the franking mark and/or the regulated customer area. If the address is not detected correctly, then the operator can move the desired address block closer to the centre of view field at act 515. In case of repeated failures, the operator may go directly to act 535 and place the mailpiece in an error/reject bin 109. Otherwise, if the address is correctly detected, the sortation parameter is extracted from the address at act 520.

At act 530, the address matching software 18E performs a look-up in the address database 20 to determine if the extracted address or sortation parameter value is known and/or corresponds to a valid address. Again, the term address database is used in a broad sense to describe a database containing a set of valid addressee, department or company names, postal addresses, ZIP codes, or other parameters which can be matched with the destination bins. If this is not the case, the operator places the mailpiece in an error/reject bin 109 at act 535.

If the address is validated, then the operator places the mailpiece in the destination bin known by him at act 540. At act 550, the spatial position and/or tag identifier of the destination bin is recorded in the sorting application software 18F. The spatial position of the bin may be acquired using the 3D sensors 16D, by locating the bin within a 3D image of the complete sorting station, or with respect to markers such as large tags or easily identifiable objects or colours corresponding to a specific group of bins. Otherwise, if the system has no spatial positioning features, the tag identifier of the destination bin is recorded in the sorting application software 18F for subsequent indications and/or confirmations.

At act 560, the bin information recorded in the sorting application software 18F is associated with the virtual bin already predefined for the address or parameter value extracted from the image of the mailpiece. The act 570 corresponds to the repetition of acts 500 to 560 till all (physical) destination bins, including the error/reject bin 109 or all other specific bins, have been recorded.

Once all mailpieces having a valid address have been deposited in their destination bins, the operator checks the ones having an invalid or unknown address at act 580. The address may not exist in the concerned company, subsidiary, department, city or even country. The address may be valid but not recognized by the image analysis software 18C and/or the sorting application software 18F. The address may also be the one of a new person in the company, not yet recorded in the address database 20. Some verification may be required before the address is approved, and the mailpiece is assigned to a virtual bin of the sorting application software 18F at act 590, and placed in the corresponding physical bin. Eventually a new virtual bin is created in the sorting application software 18F, and an existing or new physical bin associated to it. Otherwise, if the address is not approved, the mailpiece is put apart till a solution is found.

Figure 6:
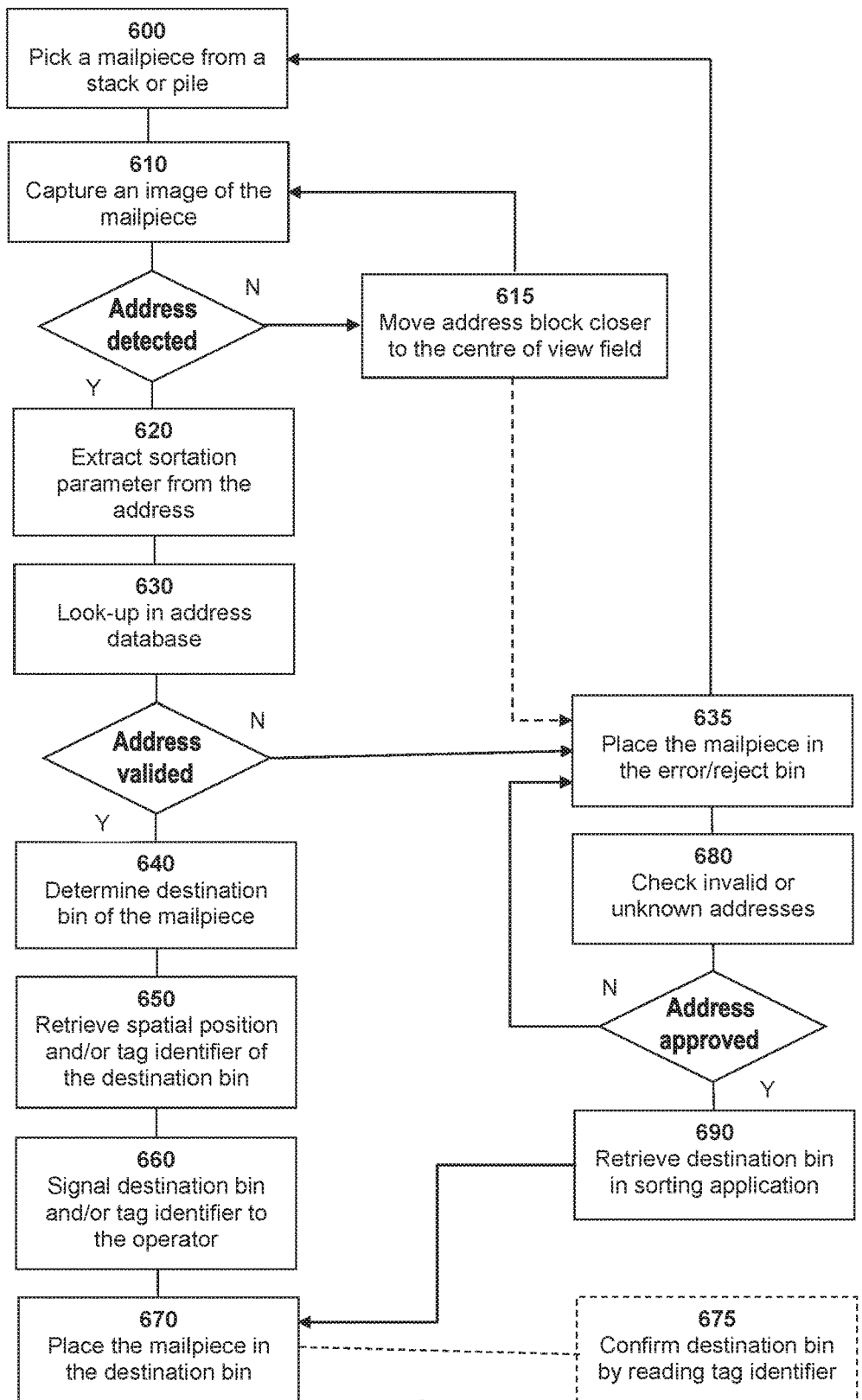
FIG. 6 is a flowchart showing the main acts for operating the system according to an embodiment of the invention.

FIG. 6 is a flowchart showing the main acts for operating the system of the invention. The operator is performing standard sorting operation with the assistance of the system. The act 600 to 635 are basically the same as the acts 500 to 535 above and do not need to be described. The process will be described staring from a positive outcome of the act 630 (the address or sortation parameter value is validated).

At act 640, the (virtual) destination bin of the mailpiece is determined by the sorting application software 18F. The spatial position or tag identifier corresponding to the destination bin is retrieved from the bin information recorded during the set-up phase. Then at act 660, the (physical) destination bin is signalled to the operator by highlighting it or overlaying a visual artifact, for instance the dotted rectangle 36. Then at act 670, the operator places the mailpiece in the signalled destination bin, which position is optionally confirmed at act 675 by reading the tag identifier before or just after the deposition of the mailpiece.

Once all mailpieces having a valid address have been deposited in their destination bins, the operator checks the ones having an invalid or unknown address at act 680. The reasons for the address not being recognized may be the same than in the set-up phase. Some verification may be required before the address is approved, the virtual destination bin is retrieved in the sorting application software 16F at act 590, and the mailpiece is placed in the corresponding physical bin. Similarly, a new virtual bin may be created in the sorting application software 16F, and an existing or new physical bin associated to it. Otherwise, if the address is not approved, the mailpiece is put apart till a solution is found.

FIGS. 1 to 6 described above are only illustrative. Many variations are possible whiteout departing from the spirit and scope of the invention. The systems and methods of FIGS. 1, 2A, 2B, 5 and 6 correspond mostly to mailroom applications, but similar systems and methods may be used in postal sorting centres. The examples of FIGS. 3A, 3B and 4 focus on address block extraction and sortation parameters linked to the address content, but the system may &so use parameters extracted from the image of the mailpiece outside the address, like for instance, the name, the origin or category of mail, a specific postal service mark or an information that can be extracted from the franking mark and/or the regulated customer area. The sortation parameters extracted from the image of the mailpiece may be replaced or supplemented with vocal information input by the operator, notably when one parameter cannot be captured by vision, or a scale may be connected to the computer for the weight of a mailpiece to be captured automatically.

The invention claimed is:

1. An assisted manual mail sorting system for assisting an operator in manual sortation of mailpieces in a sorting station including a plurality of destination bins, the system comprising a headset wearable by the operator and connected to a computer comprising an image analysis software for extracting from an image of one of the mailpieces, a name, an address or other relevant parameter and a sorting application for determining a corresponding relevant destination bin, wherein the headset comprises:
   a high resolution camera for capturing the image of the mailpiece,
   a transparent display for signaling to the operator the relevant destination bin where the article is to be placed by highlighting, or overlaying a visual artifact on, a position relative to a physical destination bin while the operator is looking at the sorting station through the transparent display.

2. The assisted manual mail sorting system of claim 1, wherein the headset and the computer are integrated in a single wearable unit and wirelessly connected to a remote server.

3. The assisted manual mail sorting system of claim 1, further comprising a scale connected with the computer or with the remote server.

4. The assisted manual mail sorting system of claim 1, further comprising acquiring a spatial position of the relevant destination bin by analyzing an image of the sorting station captured by the high resolution camera with respect to markers of the sorting station.

5. The assisted manual mail sorting system of claim 1, wherein the headset further comprises 3D sensors for acquiring a spatial position of the destination bins.

6. The assisted manual mail sorting system of claim 1 wherein each of the destination bins bear a name or a tag identifier.

7. The assisted manual mail sorting system of claim 6, wherein the determination of the relevant destination bin is based on reading its name or tag identifier with the high resolution camera.

8. The assisted manual mail sorting system of claim 1, wherein the transparent display comprises a target to be positioned on a graphic element of the mailpiece or on the names or tag identifiers of the destination bins before capturing an image on the mailpiece or reading the name or tag with the high resolution camera.

9. The assisted manual mail sorting system of claim 8, wherein the target is a visual artifact displayed when the graphic element is not located within a predetermined duration.

10. An assisted manual mail sorting method for assisting an operator in manual sortation of mailpieces in a sorting station including a plurality of destination bins, the method comprising:
   capturing with a high-resolution camera an image of the mailpiece,
   extracting from the captured image, with an image analysis software of a computer, a name, an address or other relevant parameter to determine with a sorting application a corresponding relevant destination bin, and
   signaling to the operator with a transparent display the relevant destination bin where the article is to be placed by highlighting, or overlaying a visual artifact on, a position relative to a physical destination bin while the operator is looking at the sorting station through the transparent display,
   wherein the high-resolution camera and the transparent display are included in a headset wearable by the operator and connected to the computer.

11. The assisted manual mail sorting method of claim 10, further comprising:
   notifying an indication or confirmation to the operator that the article has been placed in the relevant destination bin.

12. The assisted manual mail sorting method of claim 10, wherein the relevant destination bin is determined according to information previously recorded in the sorting application during a setup phase.

13. The assisted manual mail sorting method of claim 12, wherein the recorded information comprises a spatial position of the relevant destination bin acquired by analyzing an image of the sorting station captured by the high resolution camera with respect to markers of the sorting station.

14. The assisted manual mail sorting method of claim 12, wherein the recorded information comprises a spatial position of the relevant destination bin acquired with a 3D sensor by locating the bin within a 3D image of the sorting station.

15. The assisted manual mail sorting method of claim 12, wherein each of the destination bins bears at least a name or tag identifier, further comprising:
   reading with the high-resolution camera the name or tag identifier of the relevant destination bin, and wherein the recorded information includes the name or tag identifier.

16. An assisted manual mail sorting system to assist in manual sortation of mailpieces at a sorting station that includes a plurality of destination bins, the system comprising:
   a wearable headset, the wearable headset including a high resolution camera and a transparent display, the high resolution camera operable to capture images of at least one of the mailpieces when in a field of view of the high resolution camera; and
   a computer communicatively coupled to the high resolution camera and the transparent display of the wearable headset and that includes at least one processor and at least one non-transitory storage medium communicatively coupled to the at least one processor, the at least one non-transitory storage medium which stores a set of processor-executable image analysis instructions which, when executed by the at least one processor, cause the at least one processor to extract from images of the at least one mailpiece, a name, an address or other relevant parameter, and which also stores a processor-executable sorting application which, when executed by the at least one processor, causes the at least one processor to determine a corresponding relevant destination bin based on information extracted from the image, and cause the transparent display to present a signal indicative of the relevant destination bin where the article to be placed by highlighting, or overlaying a visual artifact on, a position relative to a physical destination bin while at least a portion of the sorting station is in a field of view of the transparent display.

17. The assisted manual mail sorting system of claim 16, wherein the headset and the computer are integrated in a single wearable unit and wirelessly connected to a remote server.

18. The assisted manual mail sorting system of claim 16, further comprising a scale connected with the computer or with the remote server.

19. The assisted manual mail sorting system of claim 16, wherein the headset further comprises 3D sensors responsive to a spatial position of the destination bins.

20. The assisted manual mail sorting system of claim 16, wherein the transparent display comprises a target to be positioned on a graphic element of the mailpiece or on the names or tag identifiers of the destination bins before capturing an image on the mailpiece or reading the name or tag with the high resolution camera.

\* \* \* \* \*